March 10, 1959 L. A. ELLISON 2,877,060
LINKED TRACK OF CRAWLER TRACK TYPE TRACTORS
Filed Aug. 6, 1956 2 Sheets-Sheet 1

INVENTOR.
Luther A. Ellison
BY Kenneth M. Thorp
atty.

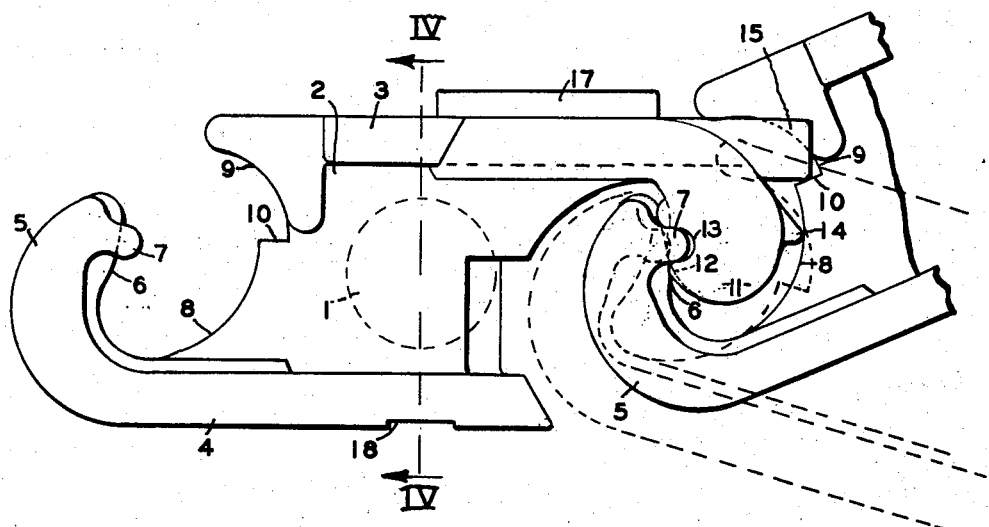
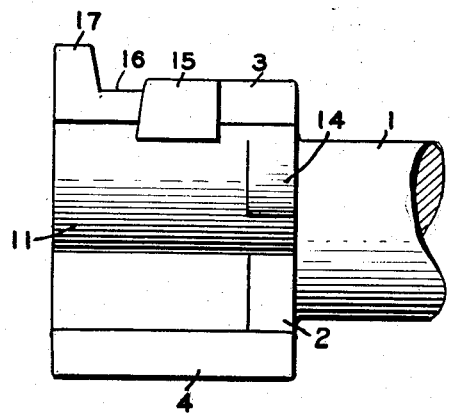
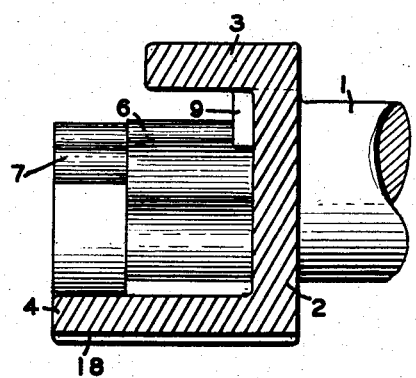

United States Patent Office

2,877,060
Patented Mar. 10, 1959

2,877,060

LINKED TRACK OF CRAWLER TRACK TYPE TRACTORS

Luther A. Ellison, Topeka, Kans.

Application August 6, 1956, Serial No. 602,210

4 Claims. (Cl. 305—10)

This invention relates to endless treads for, but is not limited to, linked track of crawler, track-type tractors, and other chain and/or linkage type conveyances and has for its general object to produce a tread in which all of the links are duplicates and are therefore interchangeable.

Another object of the invention is to minimize friction and excessive wear and to reduce bearing and greasing difficulties by supplying the ends of the links with unlubricated convex bearing surfaces in line bearing or rolling contact interconnecting the links, which automatically maintain themselves clear of obstructions and having rolling rather than sliding contact similar to a wheel as it rolls on a track.

A further object of the invention is to provide the links with self-aligning interconnecting hooks which can be readily attached or detached by supplying slack in the track tread linkage and then rocking a pair of links to a predetermined plane at which point they can be readily detached or attached, eliminating the need of a master link.

A still further object of the invention is to provide a tread link formed with a track guide accommodating the flange on the drive and idler wheels of a tractor to insure that the parts are always in proper tracking engagement.

With the general objects named in view and others as will hereinafter appear, the invention consists in certain novel and useful features of construction and organization of parts as hereinafter described and claimed; and in order that it may be fully understood, reference is to be had to the accompanying drawings, in which:

Figure 2 is a side elevation of a pair of links in full lines in the position they occupy when starting around a sprocket wheel, and in dotted lines when swung to detaching relation.

Figure 3 is a fragmental end view of the right hand end of the link as shown in Figure 1.

Figure 4 is a section on the line IV—IV of Figure 2.

Figure 1:
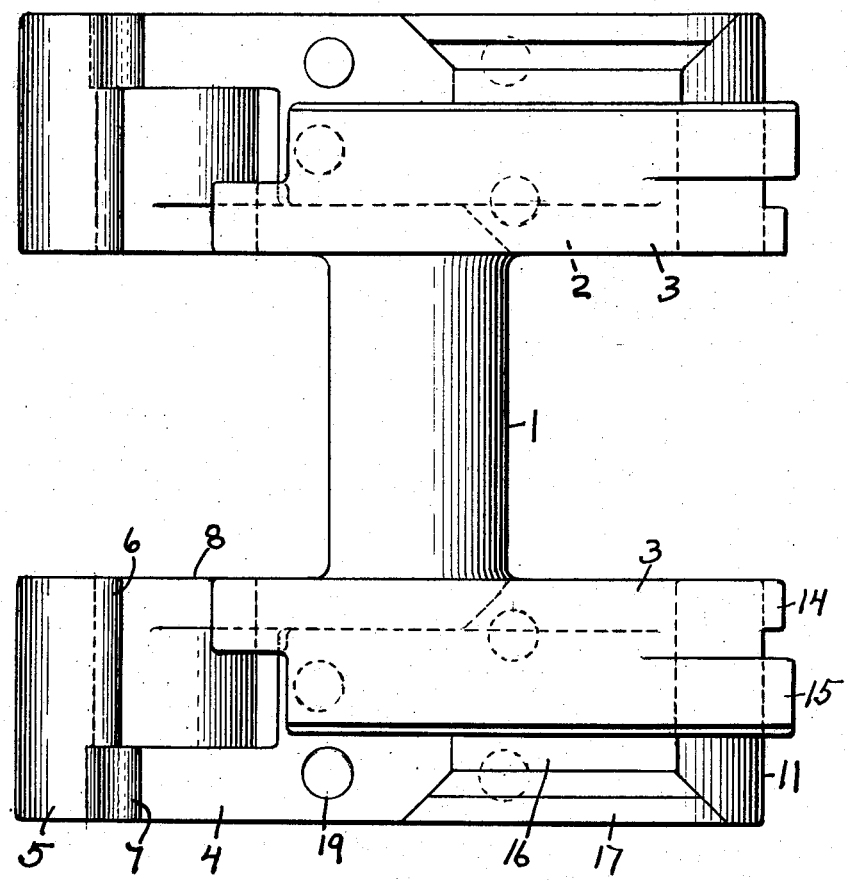
Figure 1 is a plan view of a link as shown from its track side.

In the said drawings, where like reference characters identify corresponding parts in all of the figures, the tread links comprise a generally H-shaped member having a cross bar 1 which is in driven engagement with the tractor sprocket wheel (not shown), the ends of said member having parallel flanges 2, which respectively terminate along their corresponding longitudinal edges in co-planar track flanges 3 and tread flanges 4, both of which project outwardly from the plane of the outer face of the flanges 2.

One end of the tread flanges 4 are curved to form an open hook 5 provided with an inner convex operating face 6 which extends substantially for the full width of the flange 4 except at its outer edges where it is cut away and a projecting interlocking lug 7 is formed for seating in a socket hereinafter identified, in a companionate tension hook formed at the other end of each link. Opposite the operating face 6, the flange 2 is cut into two segmental sections 8 and 9, connected by an offset shoulder 10, the segmental section 8 constituting an abutment preventing detachment of the links as will hereinafter appear and the section 9 constituting a relief which will permit detachment of the links.

The end of the flange 3 opposite hook 5 is formed with a curved open hook member 11 having a convex operating face 12 for line bearing contact on the corresponding surface 6 of the hook 5. This rocking surface 12 also extends for substantially the full width of the flange 3 except that at its outer end it is formed with a socket 13 accommodating the lug 7 of an adjacent link.

Also projecting from the outer side of the hook 11 is an abutment lug 14 which by riding on segment 8 prevents disconnection of adjacent links, but when the links are rocked to dotted line position, Figure 2, so that lug 14 passes shoulder 10, the links can be bodily approached until lug 7 is disengaged from socket 13 when the parts are free for separation as will be readily understood. This detaching relationship can occur only when the tractor sprockets have been adjusted to provide sufficient slack to permit rocking of the treads the necessary distance to attain a position comparable to the dotted line position shown in Figure 2.

To lessen clatter of the track surfaces as they pass from one idler to another, the flanges 3 are formed at one end with extension lugs 15 which bridge the gap which would otherwise occur as the links pass from contact with one idler into contact with another. Also in order to lessen chance of the idlers being misaligned in relation to the track, the track surface 3 is provided with a groove 16 receiving the outer flanges of the idler rollers, said flange being in guide relation by contact with an extension inclined wall 17. The tread flange 4 may be provided with cross slots 18 and bolt receiving openings 19 to receive tread wear plates as common in treads of this character.

From the above description and drawings, it will be apparent that I have produced a construction embodying all of the features of advantage set forth as desirable, and while I have described and illustrated the preferred embodiment, it is to be understood that I reserve the right to all changes within the spirit and scope of the appended claims.

I claim:

1. In a crawler type tractor tread, a link having its opposite ends terminating in reversely facing companionate tension hooks, each of said hooks being formed with a convex working face adapted for rolling contact with the convex face of an adjacent hook, and means on the opposite ends of the link for cooperative engagement with adjacent links to prevent separation of the links.

2. A crawler type tread comprising a plurality of identical links, each link having its opposite ends terminating in reversely facing hooks with convex operating faces adapted for rolling contact with the convex faces of the hooks of adjacent links, a lug projecting from one end of each link, and a socket on the adjacent link receiving said lug to prevent separation of the links in a plane transverse to their longitudinal axes.

3. A crawler type tread comprising a plurality of identical links, each link having its opposite ends terminating in reversely facing hooks with convex operating faces adapted for rolling contact with the convex faces of the hooks of adjacent links, a concave abutment segment on one link, and an abutment lug projecting from the adjacent link in cooperative engagement with the abutment segment to maintain the convex operating faces of adjacent links in engagement.

4. A crawler type tread comprising a plurality of identical links, each link having its opposite ends terminating in reversely facing hooks with convex operating faces adapted for rolling contact with convex faces of the hooks of adjacent links, a lug projecting from one link, a socket on the adjacent link receiving said lug to prevent relative movement of adjacent links in a plane transverse to the longitudinal axes of the links, a concave abutment segment and a companionate abutment lug on the opposite ends of each link, said abutment segment having two sections in offset relation, the companionate abutment lug of each link normally coacting with one section of the abutment segment to prevent separation of adjacent links and movable into the other section of the abutment segment to permit separation of the links when said links are oscillated to predetermined relation.

References Cited in the file of this patent

UNITED STATES PATENTS

| 1,308,308 | Sullivan | July 1, 1919 |
| 1,635,597 | White | July 12, 1927 |

FOREIGN PATENTS

| 398,988 | Great Britain | Sept. 28, 1933 |